United States Patent
Newman et al.

(10) Patent No.: US 11,805,491 B2
(45) Date of Patent: Oct. 31, 2023

(54) COMPACT TIMING SIGNAL FOR LOW-COMPLEXITY 5G/6G SYNCHRONIZATION

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

( * ) Notice: Subject to any disclaimer, the term of this patent is extended or adjusted under 35 U.S.C. 154(b) by 0 days.

(21) Appl. No.: 18/098,290

(22) Filed: Jan. 19, 2023

(65) Prior Publication Data

US 2023/0155796 A1    May 18, 2023

Related U.S. Application Data

(60) Provisional application No. 63/437,839, filed on Jan. 9, 2023, provisional application No. 63/435,061, filed on Dec. 23, 2022, provisional application No. 63/476,032, filed on Dec. 19, 2022, provisional application No. 63/431,810, filed on Dec. 12, 2022.

(51) Int. Cl.
| | |
|---|---|
| *H04W 56/00* | (2009.01) |
| *H04J 3/06* | (2006.01) |
| *H04L 7/00* | (2006.01) |
| *H04J 11/00* | (2006.01) |
| *H04L 27/26* | (2006.01) |

(52) U.S. Cl.
CPC ......... *H04W 56/005* (2013.01); *H04J 3/0661* (2013.01); *H04J 3/0667* (2013.01); *H04J 11/00* (2013.01); *H04L 7/007* (2013.01); *H04L 7/0037* (2013.01); *H04L 27/2601* (2013.01); *H04W 56/003* (2013.01); *H04W 56/0055* (2013.01); *H04W 56/0075* (2013.01); *H04J 2011/0013* (2013.01); *H04J 2011/0096* (2013.01)

(58) Field of Classification Search
None
See application file for complete search history.

(56) References Cited

U.S. PATENT DOCUMENTS

| | | | |
|---|---|---|---|
| 6,058,101 A | 5/2000 | Huang | |
| 10,868,664 B2 | 12/2020 | Goldin | |
| 2008/0112509 A1 | 5/2008 | Bock | |
| 2010/0097153 A1 | 4/2010 | Rexberg | |

(Continued)

*Primary Examiner* — Jamaal Henson

(57) ABSTRACT

Uplink messages in 5G and 6G are expected to arrive at the base station in alignment with the base station's resource grid, at the proper time and frequency. Disclosed are lean procedures and compact timing signals that can enable user devices to maintain synchronization with a base station's resource grid. Shaped timing signals are disclosed that, when measured by a receiver, can indicate whether the receiver's clock is synchronized with the transmitter's clock, or is in disagreement, and in which direction, and by how much. The receiver thereby determines the clock error by amplitude measurements only, since the timing signal is configured to convert the timing error into a readily determined amplitude value, which the receiver can quantify using normal amplitude-demodulation procedures. The receiver's amplitude resolution corresponds to the time resolution achievable. No special time-measurement signal processing is required. No synchronization messages or other legacy overhead are required.

15 Claims, 9 Drawing Sheets

(56) References Cited

U.S. PATENT DOCUMENTS

| | | |
|---|---|---|
| 2013/0198276 A1 | 8/2013 | Leppanen |
| 2014/0307729 A1* | 10/2014 | Son .................... H04J 11/0069 |
| | | 370/350 |
| 2016/0073370 A1* | 3/2016 | Axmon ............ H04W 56/0015 |
| | | 370/350 |
| 2016/0330011 A1* | 11/2016 | Lee .................... H04W 52/10 |
| 2017/0005533 A1* | 1/2017 | Zeine ................ H04W 56/0075 |

* cited by examiner

FIG. 1D

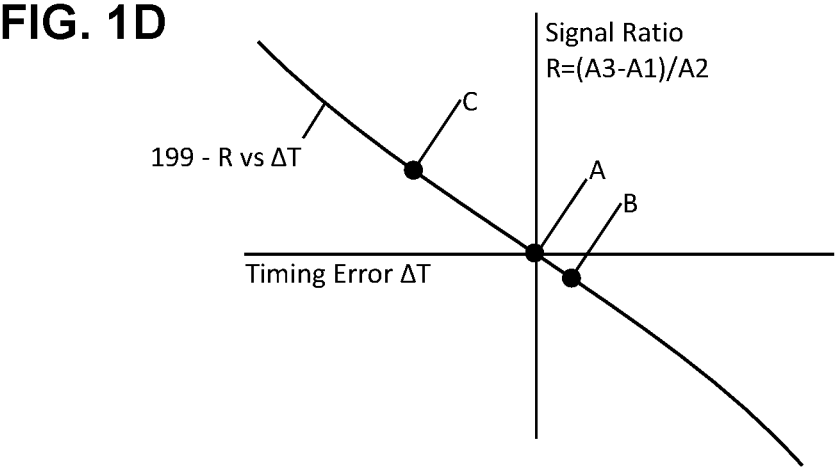

FIG. 1E

161 - Transmitter: At predetermined time, transmit a timing signal spanning 3 symbol-times including a blank symbol-time S1, a uniformly powered symbol-time S2, and another blank symbol-time S3. Enforce abrupt turnon-turnoff at boundaries.

↓

162 - Receiver: Receive the timing signal and process according to receiver's own symbol boundaries and clock time. Measure average amplitude or integrated power in each symbol-time A1, A2, A3.

↓

163 - Calculate ratio R = (A3-A1)/A2. This is the difference between average power measured in the two outer symbol-times, normalized to the average power in the central symbol-time. Alternatively, R = (A3-A1)/(|A1|+|A2|+|A3|). If transmitter and receiver clocks are synchronized, R=0.

↓

164 - Based on sign of R, determine whether receiver clock is ahead or behind the transmitter clock. Using a previously-calibrated coefficient, calculate the size of the clock disagreement.

↓

165 - Option: Count only the last half of S1 and the first half of S3 to avoid other encroaching signals.

↓

166 - Option: Transmitter can apply an amplitude enhancement at start and end of the powered region, for greater time resolution.

↓

167 - Option: Transmitter can transmit timing signals periodically. Receiver can measure the time between two sequential timing signals, and thereby correct a clock rate (or frequency) disagreement.

Signal Ratio
R = (A3+A1)/(|A1|+|A2|+|A3|)

899 - R vs ΔT

Timing Error ΔT

COMPACT TIMING SIGNAL FOR LOW-COMPLEXITY 5G/6G SYNCHRONIZATION

PRIORITY CLAIMS AND RELATED APPLICATIONS

This application claims the benefit of U.S. Provisional Patent Application Ser. No. 63/431,810, entitled "Mid-Symbol Timestamp Point for Precision Synchronization in 5G and 6G", filed Dec. 12, 2022, and U.S. Provisional Patent Application Ser. No. 63/476,032, entitled "Guard-Space Timestamp Point for Precision Synchronization in 5G and 6G", filed Dec. 19, 2022, and U.S. Provisional Patent Application Ser. No. 63/435,061, entitled "Compact Timing Signal for Low-Complexity 5G/6G Synchronization", filed Dec. 23, 2022, and U.S. Provisional Patent Application Ser. No. 63/437,839, entitled "Ultra-Lean Synchronization Procedure for 5G and 6G Networking", filed Jan. 9, 2023, all of which are hereby incorporated by reference in their entireties.

FIELD OF THE INVENTION

The disclosure pertains to synchronization of clocks using a wireless signal that indicates timing information.

BACKGROUND OF THE INVENTION

Wireless messages depend on tightly controlled timing, so that modulated signals will be received at the expected time with the correct frequency. Distributing the timing information by cable is no longer feasible, as many users are mobile or at least portable; hence the time synchronization and clock rate are generally distributed in wireless messages. Due to the very high frequencies planned for in 5G and 6G, improved means are needed to enable user devices to synchronize their timing and frequency precisely, without excessive messaging and overhead.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a wireless receiver to synchronize a clock, the method comprising: receiving or determining a synchronization schedule; receiving, according to the synchronization schedule, a timing signal comprising a wireless signal, wherein the wireless signal is received on a particular subcarrier and spans a plurality of symbol-times of a resource grid, wherein the resource grid comprises subcarriers in frequency and symbol-times in time, wherein the plurality of symbol-times comprises a first symbol-time and a last symbol-time; determining, for each symbol-time of the timing signal, according to a receiver clock of the receiver, a measured amplitude comprising an average amplitude or an average power or a total energy received in the symbol-time; calculating a ratio "R" comprising a numerator divided by a denominator, wherein the numerator comprises a sum or difference of the measured amplitudes in the first and last symbol-times, and the denominator comprises the measured amplitude in at least one symbol-time of the plurality.

In another aspect, there is a base station of a wireless network comprising one or more user devices, the base station configured to: periodically broadcast a system information message comprising an SSB (synchronization signal block) message or an SIB1 (system information message type 1) message, wherein the system information message indicates a periodicity or a schedule for transmission of a timing signal; and periodically broadcast the timing signal on a particular subcarrier of a resource grid according to a transmitter clock of the base station, wherein the resource grid comprises subcarriers in frequency and symbol-times in time, wherein the timing signal spans exactly two or three sequential symbol-times, and wherein the timing signal comprises, in the stated order: an initial period with zero transmission therein; a central period comprising non-zero transmission therein; and a final period with zero transmission therein.

In another aspect, there is non-transitory computer-readable media in a user device of a wireless network comprising a base station, the media containing instructions that when implemented in a computing environment cause a method to be performed, the method comprising: according to a predetermined schedule or periodicity, receiving a first timing signal; according to the predetermined schedule or periodicity, receiving a second timing signal, wherein each timing signal, of the first and second timing signal, comprises a wireless signal spanning exactly two or exactly three symbol-times of a resource grid, wherein the resource grid comprises subcarriers in frequency and symbol-times in time; determining, according to the first timing signal, a first time error comprising a first time difference between a clock of the user device and a clock of the base station; determining, according to the second timing signal, a second time error comprising a second time difference between the clock of the user device and the clock of the base station; and adjusting a clock rate or a frequency of the clock of the user device according to a difference between the first and second time errors.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 1D is a graph showing an exemplary embodiment of a functional relationship between a timing error and a detection ratio, according to some embodiments.

FIG. 1E is a flowchart showing an exemplary embodiment of a procedure for performing synchronization, according to some embodiments.

Like reference numerals refer to like elements throughout.

DETAILED DESCRIPTION

Figure 1A:
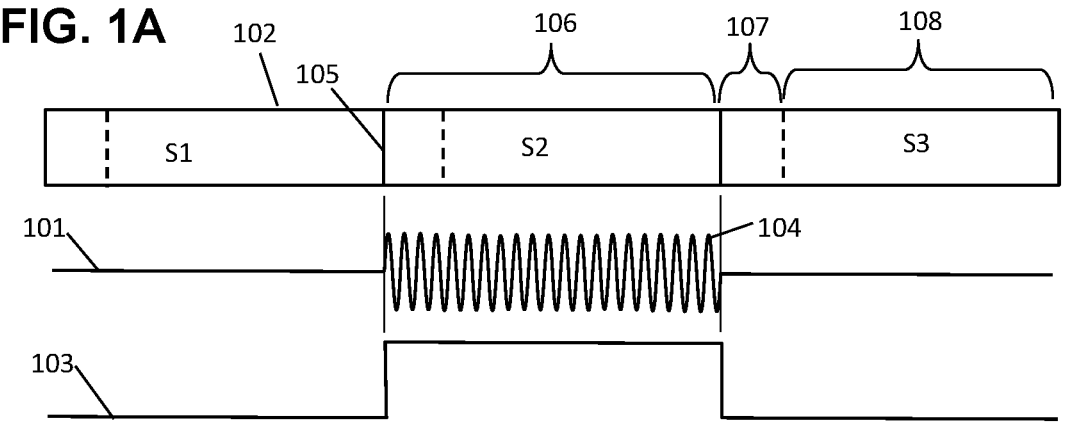
FIG. 1A is a schematic showing an exemplary embodiment of a timing signal including three symbol-times, according to some embodiments.

Systems and methods disclosed herein (the "systems" and "methods", also occasionally termed "embodiments" or "arrangements" or "versions" or "examples", generally according to present principles) can provide urgently needed wireless communication protocols for precisely synchronizing clocks using wireless signals configured to indicate a particular time according to amplitude variations that a receiver can measure. Improved precision timing will be required for reliable communication at the high frequencies planned for 5G and 6G. Timing signals disclosed herein may be configured to enable rapid precision time and frequency adjustment, according to some embodiments. Lean and efficient procedures are also disclosed for precise time adjustment, thereby avoiding unnecessary messaging and overhead, according to some embodiments.

Examples below include a brief timing signal spanning two or three symbol-times. The timing signals include shaped amplitude regions adjacent to regions of zero transmission. The timing signal is received by a receiver and analyzed according to the signals received in each symbol-time. The receiver's symbol boundaries are determined by the receiver's system clock, but the timing signal itself is determined by the transmitter's clock. Therefore, any disagreement between the transmitter and receiver clocks causes the position of the timing signal to shift, relative to the receiver's symbol boundaries, which causes the signal in one symbol-time to partially shift over into an adjacent symbol-time. Hence the receiver can measure the clock disagreement by determining the amount of signal shifted over from a powered symbol-time into an adjacent unpowered symbol-time. Even a small amount of power may be detected when it is shifted into the quiet symbol-time, thereby leading to high sensitivity, according to some embodiments.

Some wireless receivers have signal processing capabilities to detect a brief signal in an otherwise unpowered symbol-time. Other wireless receivers measure the average amplitude received at a particular subcarrier during each symbol-time. The receiver may alternatively measure a power level or a received energy when a signal is present for only a fraction of the symbol-time. To cover all of these modes of reception, the amount of signal received in each symbol-time is referred to herein as the "measured amplitude" in each symbol-time, regardless of how the receiver measures the voltage or power or total energy or other type of signal property. The important point is that the receiver can determine the timing error by measuring amplitudes of signals in symbol-times, without the need to measure the times of timestamp features, and without exchanging legacy synchronization messages, thereby providing a substantial simplification at low/zero cost, according to some embodiments.

The receiver can quantify the timing disagreement by calculating a "signal ratio" R based on ratios of the measured amplitudes. In examples below, the ratio equals zero when the receiver clock and the transmitter clock are synchronized, and R increases monotonically if they are not synchronized. The signal ratio may thereby indicate whether the clocks are in disagreement, and by how much, and in which direction. In many cases, the receiver can determine timing disagreements more precisely using the signal ratio R, than with the legacy "first bit of first octet" procedures, according to some embodiments.

An advantage of the disclosed procedures may be that the base station can specify the synchronization schedule precisely in, for example, a system information file such as an SSB or SIB1 message, thereby avoiding bulky synchronization messages of the prior art for each instance of the timing signal. Another advantage may be that all of the user devices in a network can simultaneously synchronize their clock settings and clock frequencies to the base station according to the schedule, while avoiding unnecessary uplink transmissions. Another advantage may be that a receiver can determine a timing error based on amplitude measurements alone, without requiring special signal processing to measure a timestamp point explicitly. Another advantage may be that the disclosed methods employ the same amplitude-measuring capabilities that modern wireless receivers already have. Another advantage may be that the timing information may be transferred in compact timing signals, each spanning just two or three resource elements. Another advantage may be that the disclosed timing signals may involve zero power transmission during a portion of the timing signals, thereby saving further power and avoiding contributing to backgrounds. Another advantage may be that the disclosed timing signals, being compact and highly resource-efficient, may enable the base station to broadcast timing signals frequently (such as once per frame or subframe) thereby enabling IOT user devices to maintain sufficient synchronization even with low-cost oscillators for timing, according to some embodiments.

Examples presented below are suitable for adoption by a wireless standards organization. Providing agreed-upon standards for the format and interpretation of the a compact, precision timing signals disclosed herein may enable user devices to rapidly synchronize to the base station, and may thereby optimize communication reliability at high frequencies, without unnecessary messaging.

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period" or "symbol-time", and a specific frequency and bandwidth termed a "subcarrier" (or "subchannel" in some references). Each symbol-time is bounded by symbol boundaries, according to a resource grid determined by a local clock. "OFDM symbols" (Orthogonal Frequency-Division Multiplexing) are symbol-times in which the individual signals of multiple subcarriers are added in superposition. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also termed "resource element groups" or "REG" or "channels" in references) including 12 subcarriers, with each subcarrier at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message. "SNR" (signal-to-noise ratio) and "SINR" (signal-to-interference-and-noise ratio) are used interchangeably unless specifically indicated. "RRC" (radio resource control) is a control-type message from a base station to a user device. "Digitization" refers to repeatedly measuring a waveform using, for example, a fast ADC (analog-to-digital converter) or the like. An "RF mixer" is a device for multiplying an incoming signal with a local oscillator signal, thereby selecting one component of the incoming signal. "IOT" or Internet-of-things refers to single-purpose wireless devices, usually low-performance. "SSB" (synchronization signal block) and SIB1 (system information block 1) are system information messages.

In addition to the 3GPP terms, the following terms are defined. As used herein, a "timing signal" is an RF (radio frequency) signal transmitted by a transmitter with a particular amplitude distribution configured to enable a receiver to detect timing disagreements between the transmitter's clock and the receiver's clock. A receiver can detect the timing signal, and determine the position (or time) of the amplitude variations relative to the receiver's symbol boundaries according to the receiver's clock. The receiver can then adjust its clock time according to the timing error thus measured, thereby synchronizing with the base station. "Synchronization" means adjusting a clock setting to match another clock's time. Sequential symbol-times of a timing signal may be termed "S1", "S2". and "S3", while the measured amplitudes in those symbol-times may be termed "A1", "A2", "A3" respectively.

Turning now to the figures, examples show how a reduced-capability user device can synchronize with a base station using amplitude measurements on a compact timing signal.

FIG. 1A is a schematic showing an exemplary embodiment of a timing signal including three symbol-times, according to some embodiments. As depicted in this non-limiting example, a timing signal 101 is shown along with part of a resource grid 102 which, in this case, spans three successive symbol-times labeled S1, S2, and S3 at a particular subcarrier (not labeled). The central symbol-time is indicated as 106. Each symbol-time is bounded by symbol boundaries 105. For regular messaging, each symbol-time includes a guard-space 107 demarked by a dashed line, and the remainder of the symbol-time is a message data portion 108. However, the timing signals disclosed herein ignore the distinction between guard-space 107 and message portion 108, instead filling each symbol-time 106 entirely with a particular amplitude signal.

Also shown schematically is an amplitude envelope plot 103 indicating the timing signal 101 and the powered region 104, but with the oscillations suppressed. Thin lead lines are provided here and elsewhere, without label. The edges of the powered region 104 coincide with the symbol-time boundaries 105 of the receiver's resource grid 102, thereby indicating that the receiver clock is synchronized with the transmitter clock.

The timing signal 101 includes zero transmission in the first symbol-time S1, followed by a powered region 104 with non-zero transmission in the second symbol-time S2, followed by a third symbol-time S3 with zero transmission. The timing signal 101, including the times of the interfaces between the powered region 104 and the zero-amplitude regions, are determined by the transmitter clock. The times of the symbol boundaries 105, however, are determined by the receiver clock. If the receiver clock disagrees with the transmitter clock, the S2 symbol boundaries would be shifted relative to the timing signal 101. Consequently, part of the non-zero transmission 104 would be received in one of the adjacent symbol-times S1 or S3, thereby indicating the timing error. The receiver can measure the amount of signal received, or the measured amplitude (A1, A2, A3) received, in the three symbol-times. The receiver can then determine, according to a formula, a timing error relative to the transmitter clock. If the powered region 104 is contained entirely within the S2 symbol boundaries 105, then the timing error is zero and the two adjacent symbol-times S1 S3 will have zero transmission. But if there is a disagreement between the transmitter and receiver clocks, one of the adjacent symbol-times S1 S3 will have a non-zero amplitude therein, which the receiver can detect.

To determine the timing error between the transmitter and receiver clocks, the receiver can subtract the signal values received in the two outer symbol-times S1 and S3. If the receiver clock is in agreement with the transmitter clock, the powered portion 104 will remain centered in the central symbol-time S2, and hence A1 and A3 will remain at zero amplitude, or at most a small and substantially equal energy content due to backgrounds, so that the difference A3−A1 remains substantially zero. However, if the receiver clock is not in agreement with the transmitter clock, then the powered region 104 will be shifted relative to the receiver's symbol boundaries 105, thus causing part of the powered region 104 to be shifted into either S1 or S3.

More generally, the receiver can determine the clock disagreement, or "timing error $\Delta T$", according to a formula based on the measured amplitudes received A1, A2, and A3. The formula may be configured to cancel slowly-changing noise or interference. For example, the receiver can calculate a signal ratio R equal to a difference between the measured amplitude in the two outer symbol-times divided by the measured amplitude in the central symbol-time, or (A3−A1)/A2. This accentuates any timing shift due to the receiver clock misalignment, while canceling noise that appears in the two outer symbol-times. Dividing by the measured amplitude A2 in the central symbol-time is for normalization, since the absolute detection efficiency is generally unknown and irrelevant.

As an alternative, for improved linearity, the receiver can divide the A3−A1 difference by the sum of the magnitudes of the signals received in all three symbol-times, such as (A3−A1)/(|A1|+|A2|+|A3|). The vertical bars indicate the magnitude of the received signal. When so normalized, the signal ratio R is independent of the transmission level, gain settings, efficiencies, etc. because those variables affect the all of the amplitudes A1, A2, and A3 values proportionally.

According to the ratio, the receiver can detect such a timing error, and can determine whether the receiver's clock is fast or slow, and by how much. These determinations are based on amplitude measurements of the three symbol-times, without the need for direct time measurements and without messaging, other than the compact timing signal itself.

The powered region 104 often includes a brief "ring-up" transition at the start of the powered region 104, and a "ring-down" at the end, due to finite bandwidth. This can introduce a small asymmetry in the responses of S1 and S3. To minimize this asymmetry, the transmitter can apply extra power briefly at the start of the powered region 104, and a reverse phase at the end of the powered region 104 to squelch the ringdown. In addition, or alternatively, the receiver can calibrate the remaining asymmetry and subtract it from the amplitude measurements, before determining the timing error. Therefore the transition asymmetry will be ignored hereinafter.

If the receiver clock disagrees with the transmitter clock, the timing shift may cause extraneous signals to encroach into S1 or S3 from the outside, potentially obscuring the timing measurements. To avoid such an interference, the receiver can ignore the first half of S1 and the last half of S3, thereby discarding the encroaching signals. For example, the receiver can integrate the measured amplitude in only the second half of S1 and the first half of S3, thereby avoiding signal encroachment. Encroachment can still occur if the time disagreement is larger than one-half the symbol period, but such large timing errors would be rapidly detected by other effects such as message faults.

There is a possibility that a non-zero value of R may be due to a change in the propagation time of signals between the transmitter and receiver, due to motion or atmospheric effects, for example. When a recalibration of the propagation time is needed, a round-trip travel-time test can be performed, preferably using the timing signals disclosed herein for precision and resource efficiency. In most applications, changes in the propagation time occur on much longer time scales than clock drift, and therefore the examples herein assume that any displacement of the timing signal represents clock drift.

An advantage of the disclosed timing signal may be that all of the user devices in a managed network can adjust their clock settings to the base station, simultaneously, at no additional power expended or resources used. Each user device can determine its individual timing error and can adjust its local time-base as described. Hence the entire network of user devices can re-synchronize using a single compact timing signal that consumes just three resource elements, with no further messaging or overhead, according to some embodiments.

In addition to adjusting their clock times, the user devices can simultaneously correct their clock rates (or frequency) by measuring a difference between two successive timing errors of two successive timing signals. A change in the measured timing error is a sensitive measure of a frequency or clock rate difference between the transmitter and receiver clocks. The receiver frequency error is, to sufficient accuracy, equal to the present frequency, times a difference in the timing errors of two successive timing signals, divided by the interval separating them. Each user device can determine its frequency error and adjust its clock rate accordingly. Each user device can also correct its clock time according to the first or second timing signal, as discussed. By this method, the user devices can adjust both their clock frequency and their clock settings to synchronize with the base station.

The disclosed method can provide a rapid, lean, low-complexity, precise clock synchronization, at a cost of just three resource elements (of which only one is actually powered), according to some embodiments. The method involves only standard amplitude measurements, and hence avoids special signal processing operations such as measuring a time of a timestamp point or other feature in the timing signal. Moreover, the procedure avoids cumbersome prior-art messaging, as long as the receiver knows the periodicity or synchronization schedule of the timing signals. Embodiments of the disclosed method may therefore provide the enhanced synchronization needed for fast-cadence 5G/6G communications.

Figure 1B:
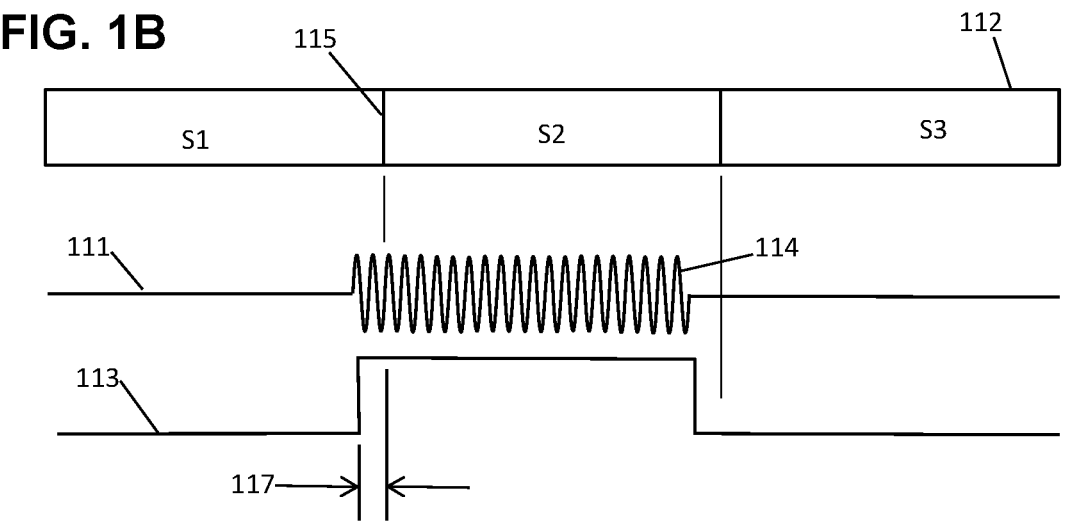
FIG. 1B is a schematic showing an exemplary embodiment of another timing signal including three symbol-times, according to some embodiments.

FIG. 1B is a schematic showing an exemplary embodiment of another timing signal including three symbol-times, according to some embodiments. As depicted in this non-limiting example, three symbol-times of a resource grid 112 include a timing signal 111 and an envelope plot 113. The example is similar to the previous case but now with a clock disagreement. In this example, the powered portion 114 of the timing signal 111 is now displaced by a displacement 117 relative to the symbol boundaries 115. A small portion of the powered region 114 therefore has been shifted into the first symbol-time S1. The receiver can determine the measured amplitude in S1, determine that it is greater than zero, and therefore determine that the receiver's clock disagrees with the transmitter. Alternatively, the receiver can determine the displacement according to a function R of the signals received in S3 and S1, and can synchronize its clock to the transmitter by subtracting the displacement 117 from the receiver's clock setting. Subsequent downlink messages should then be aligned properly with the receiver's symbol boundaries 115 without further timing corrections, according to some embodiments.

Figure 1C:
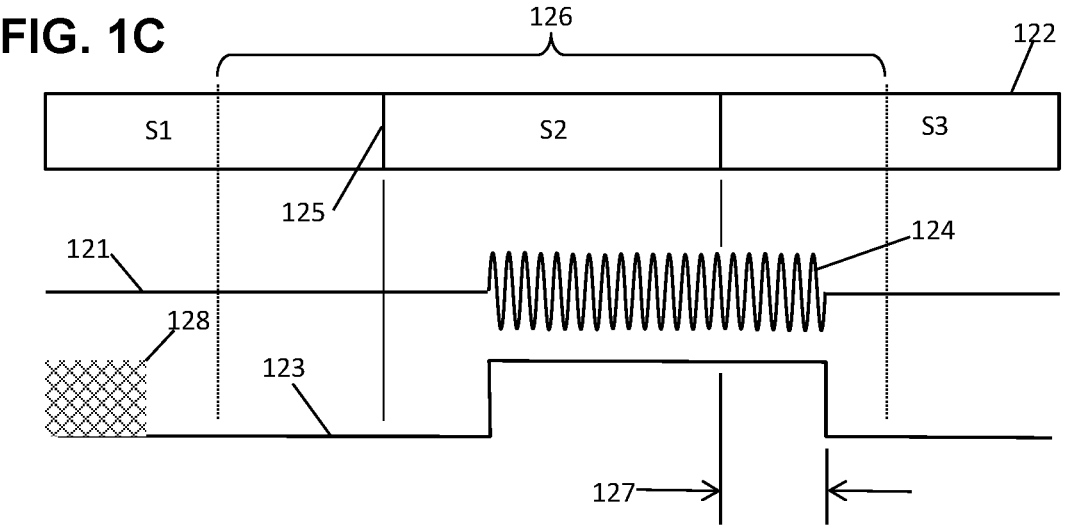
FIG. 1C is a schematic showing an exemplary embodiment of yet another timing signal including three symbol-times, according to some embodiments.

FIG. 1C is a schematic showing an exemplary embodiment of yet another timing signal including three symbol-times S1, S2, S3, according to some embodiments. As depicted in this non-limiting example, a timing signal 121, with a powered region 124, is shifted relative to the symbol boundaries 125 in the receiver's resource grid 122, by a displacement amount 127. Also shown is the amplitude envelope 123. Unexpected signal power or amplitude is therefore received in S3. The signal appearing in S3 indicates that the displacement 127 is opposite in sign from the displacement 117 of the previous example, and the size of the signal indicates that the displacement 127 is larger.

An extraneous message element 128, from an adjoining symbol-time, is encroaching into S1. To avoid interference from such encroaching signals, the receiver is configured to discard any signal in the first half of S1 and the last half of S3. Hence the receiver averages only the signals within an analysis region 126, which includes the second half of S1 and the first half of S3 (as well as the central symbol-time S2), while discarding the outer halves of S1 and S3. The ratio R is therefore unaffected by the encroaching signal 128 because it is outside the analysis region 126. The analysis region 126 limits the range of timing errors that the receiver can measure, up to one-half of a symbol-time, but that should be more than sufficient range for most applications, as mentioned.

The receiver can determine both the sign and magnitude of the displacement 127 by calculating the difference between the signals appearing in S1 and S3. Signal amplitudes depend on many factors such as unknown losses and gain settings. Therefore the A3−A1 difference may be normalized by calculating a signal ratio, such as dividing the difference by A2, or even better by dividing the difference by the sum of the amplitudes received A1+A2+A3. The receiver can then determine the sign and magnitude of the timing error based on the normalized signal ratio $R=(A3-A1)/(A1+A2+A3)$, and can adjust its clock setting by that timing error.

To consider a specific example, the difference in measured amplitude of S1 and S3 is, say, 5% of the measured amplitude in S2. The magnitude of the adjustment time is then, approximately, 5% of the width of one symbol-time. If the excess power appears in S1, the receiver's clock is late relative to the transmitter, and the receiver should reduce the receiver's clock time by the indicated adjustment time, in this case 5% of one symbol-time. Hence the receiver can synchronize its clock with the transmitter's clock according to the signal received in the three symbol-times, without directly measuring a time displacement and without exchanging messages.

The time resolution achievable by this method depends on the background noise, the stability of the background noise across three symbol-times, and the amplitude resolution of the receiver, among other factors. With good SNR, the receiver is expected to resolve clock time errors of a small fraction of the symbol-time, which should be sufficient for most cases. Later examples show how to improve the time resolution further.

FIG. 1D is a graph showing an exemplary embodiment of a functional relationship between a timing error and a signal ratio, according to some embodiments. As depicted in this non-limiting example, a functional relationship is graphed, relating the timing error ΔT (equal to a displacement of the receiver's resource grid relative to the as-received timing signal), versus a signal ratio R (which depends on the measured amplitude received in each symbol-time A1, A2, and A3). The plot shows schematically a graph 199 of the signal ratio $R=(A3-A1)/A2$ versus the time error ΔT. The letter "A" represents the example of FIG. 1A with zero timing error, "B" represents FIG. 1B with a small negative timing error, and "C" represents FIG. 1C with a larger positive timing error.

The graph 199 is roughly linear, but with a small nonlinearity at large time errors due to the division by A2. For large time errors, the amount of signal remaining in S2 decreases significantly due to the large displacement relative to the receiver's resource grid, and this artificially increases R in the manner shown. Alternatively, the receiver can divide by the sum of the magnitude signals in all three symbol times, and thereby obtain a more linear relationship. In either case, the receiver can calculate an accurate correction from the graph 199, and thereby correct the clock setting accordingly.

FIG. 1E is a flowchart showing an exemplary embodiment of a procedure for performing synchronization, according to some embodiments. As depicted in this non-limiting example, at 161 a transmitter transmits a timing message spanning three symbol-times, at a pre-scheduled time according to the transmitter's system clock. The first symbol-time is blank, with no transmission. The second symbol-time is transmitted as a continuous uniform sine wave. The third symbol-time is again blank. The transmitter is powered so as to provide an abrupt turn-on at the boundary between the first and second symbol-times, and an abrupt turn-off at the boundary between the second and third.

At 162, a receiver receives the timing signal. The receiver determines the amplitude or power received in each of the symbol-times. The symbol boundaries are determined by the receiver's clock. If the two clocks disagree, the timing signal will be shifted from the central symbol-time S2 into the first or last symbol-time S1 or S3. For example, the receiver can determine the measured amplitude received in each symbol-time, termed A1, A2, and A3. If the receiver's clock is synchronized with the transmitter's clock, the A1 and A3 values should be zero (or a low level due to background noise), and A2 should be a high level proportional to the transmitted signal amplitude. If the receiver's clock is not synchronized with the base station's clock, then a part of the powered region will be shifted over to one of the initially-blank symbol-times, which causes either A1 or A3 to have additional amplitude or power.

At 163, the receiver can calculate a ratio R equal to a difference between the measured amplitude in the first symbol-time minus the third symbol-time, divided by the second symbol-time. (Alternatively, the denominator could equal the sum of the three signals received in the three symbol-times.) R is zero when the clocks are aligned. If the clocks are in disagreement, the timing signal is shifted into either S1 or S3 depending on the sign of the clock disagreement.

At 164, based on the sign of R, the receiver can determine whether the receiver's clock is ahead or behind the transmitter's clock. The receiver can also determine the magnitude of the clock error based on the magnitude of R, for example using a predetermined relationship such as that shown in FIG. 1D.

At 165, the receiver may arrange to avoid external signals encroaching into S1 or S3, by discarding any signals received in the first half of the first symbol-time and the second half of the third symbol-time. In other words, the receiver can choose to process only the signal in the second half of the first symbol-time, the entirety of the second symbol time, and the first half of the third symbol-time. The receiver may thereby avoid counting signals from extraneous message elements that may encroach into the first and third symbol-times due to the timing error. If the timing signal is shifted into S1, for example, then an extraneous message element, from a symbol-time beyond S3, could partially spill over into S3, which would distort the R ratio. By ignoring any signals in the first half of S1 and the last half of S3, the receiver can avoid such a problem.

At 166, the transmitter can transmit enhanced amplitude regions at the start and end of the powered region, instead of a flat uniform amplitude. The enhanced amplitude regions may be configured and phased to sharpen the turn-on and turn-off times. For example, the transmitter can transmit a brief period of enhanced amplitude at the beginning of S2 to cause a rapid sharp turn-on, and a brief period of reversed amplitude at the end of S2 to squelch the ringdown. The enhanced amplitude regions at the start and end of the powered region may improve the time resolution, especially for small time deviations, and may thereby provide greater precision. The receiver may also, or alternatively, account for the edge transitions in analysis, by calibrating the remaining transition effect and adjusting the A1 and A3 measurements accordingly.

At 167, optionally, the receiver can correct its clock rate (or frequency) to match that of the transmitter. The transmitter can broadcast the timing signals periodically, or according to a synchronization schedule that the receiver knows. The receiver can then measure the time interval between two timing signals (according to the receiver's clock). If this value differs from the scheduled periodicity (according to the transmitter's clock), the receiver's clock rate has drifted. The frequency error is equal (to sufficient accuracy) to the current clock frequency, times the measured interval minus the specified periodicity, all divided by the specified periodicity.

Alternatively, the receiver can measure the timing error at each of the two successive timing signals, in which case the frequency error equals the difference between the two timing errors divided by the scheduled interval between them, times the current frequency.

Importantly, the receiver has succeeded in aligning its clock with the transmitter's clock, while avoiding unnecessary message exchanges between the transmitter and receiver, other than a single transmission of the compact timing signal configured as shown in three symbol-times, two of which are unpowered. In addition, the base station of a network can arrange a synchronization schedule or periodicity, such as the first three symbol-times of the first subcarrier of each frame, thereby enabling all of the user devices in a network to synchronize their clock settings every 10 milliseconds, without unnecessary messaging or overhead. By comparing the amount of amplitude or power shifted into the nominally zero-power symbol-times S1 and S3, the receiver can determine the timing error with higher precision than the legacy "first bit of first octet" criterion, according to some embodiments.

Figure 2A:
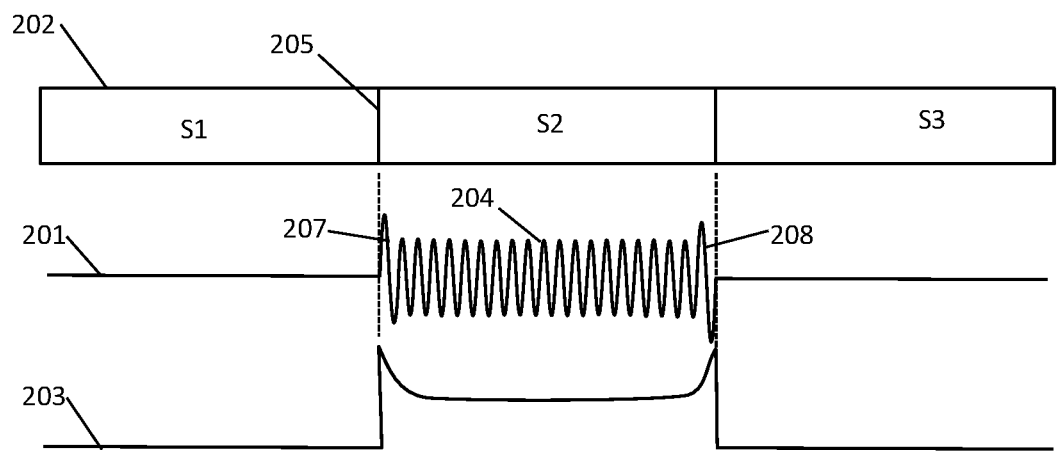
FIG. 2A is a schematic showing an exemplary embodiment of a timing signal including three symbol-times with edge enhancements, according to some embodiments.

FIG. 2A is a schematic showing an exemplary embodiment of a timing signal including three symbol-times with "edge enhancements", according to some embodiments. As depicted in this non-limiting example, a timing signal 201 occupies three symbol-times S1, S2, S3, separated by symbol boundaries 205 of a resource grid 202. The timing signal 201 is transmitted with zero amplitude during the first symbol-time S1, a powered region 204 in S2, and another zero transmission in S3. The powered region 204 includes a brief amplitude enhancement 207 first, then a constant lower amplitude, followed by a second amplitude enhancement 208 at the end of the second symbol-time. The amplitude envelope distribution 203 is also shown, without the oscillations. The amplitude enhancements 207 208 provide finer time resolution at small values of the timing error, since a small timing error causes a relatively large energy deposition into one of the adjacent symbol-times S1 or S3.

If the receiver receives the timing signal 201 and finds that the powered region 204 is centered between the S2 symbol boundaries 205, according to the receiver's resource grid structure, then the receiver can determine that the receiver's clock is synchronized with the transmitter's clock. If the clocks are not synchronous, then the powered region 204 will be shifted left or right depending on whether the receiver's clock is ahead or behind the transmitter's clock. Either the leading or trailing enhancement regions 207, 208 will be shifted into the adjacent S1 or S3 symbol-time. Using the signal ratio calculated as $R=(A3-A1)/A2$, the edge enhancements 207, 208 at the start and end of the powered region 204 cause R to increase rapidly for small time errors, and then slowly for larger time errors, as shown in the next figure.

Figure 2B:
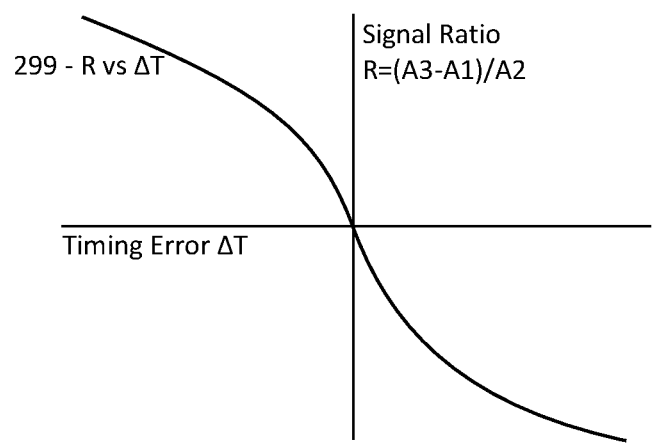
FIG. 2B is a graph showing an exemplary embodiment of a functional relationship between a timing error and a detection ratio with edge enhancements, according to some embodiments.

FIG. 2B is a graph showing an exemplary embodiment of a functional relationship between a timing error and a detection ratio with edge enhancements, according to some embodiments. As depicted in this non-limiting example, the functional variation 299 of the signal ratio R versus the time error $\Delta T$, varies in a nonlinear fashion, with a rapid change in R for small time errors, due to the amplitude enhancements, and a slower variation in R for larger time errors. Advantageously, with such a relationship between the time error and the ratio R, the receiver may detect time errors ranging from small to large, yet may retain high resolution for small time errors near zero due to the increased slope of the R distribution near zero.

Figure 3A:
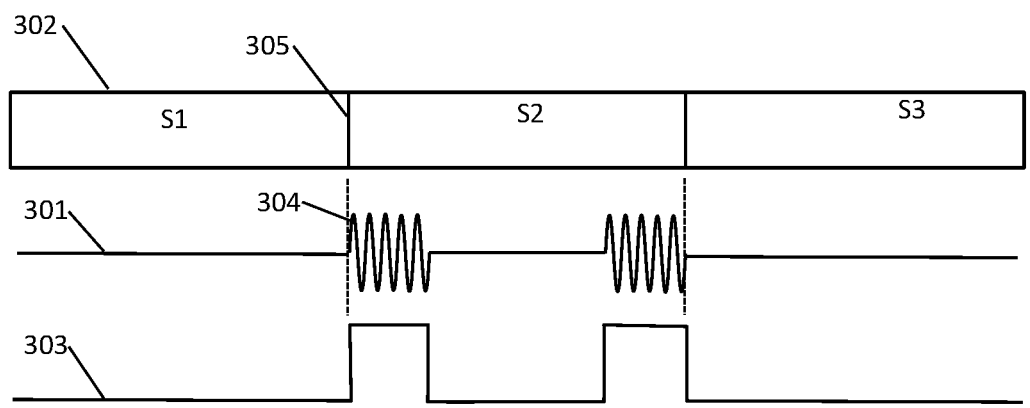
FIG. 3A is a schematic showing an exemplary embodiment of a timing signal including three symbol-times and edge-pulses, according to some embodiments.

FIG. 3A is a schematic showing an exemplary embodiment of a timing signal including three symbol-times and "edge-pulses", according to some embodiments. As depicted in this non-limiting example, a timing signal 301, spans three symbol-times S1, S2, S3 of a resource grid 302 defined by symbol boundaries 305. The timing signal 301 has zero transmission in S1 and S3. In S2, the timing signal 301 includes two "edge pulses" which are brief powered regions at the start and end of the S2 symbol-time, with zero transmission between. In other words, the central symbol-time includes three regions divided into the first edge-pulse 304 in the first region, zero transmission in the second region, and the last edge-pulse in the third region. The amplitude envelope 303 is also shown.

A receiver can receive the timing signal 301, and measure the as-received signal A1, A2, A3 in each of the three symbol-times. The receiver can then determine a signal ratio R equal to the difference between A1 and A3, divided by A2. The receiver can thereby determine the time error $\Delta T$ between the receiver's clock and the transmitter's clock. For example, if the receiver's clock is synchronized with the transmitter, both S1 and S3 have zero signal, and hence R=0.

If the receiver's clock differs from the transmitter's clock, the position of the timing signal 301 will be shifted left or right, depending on which clock is ahead, and is shifted by the amount of the timing error, and this will cause some of the edge-pulse amplitude to be shifted into one of the outer symbol-times S1 or S3. Because the edge-pulses 304 are much shorter than the symbol-time, the signal ratio R rises rapidly with the time error near zero. This rapid rise in R can thereby provide higher precision for detecting small timing errors. For larger time errors, no further change is seen in R, after the edge-pulse 304 has passed by the symbol boundary 305.

Figure 3B:
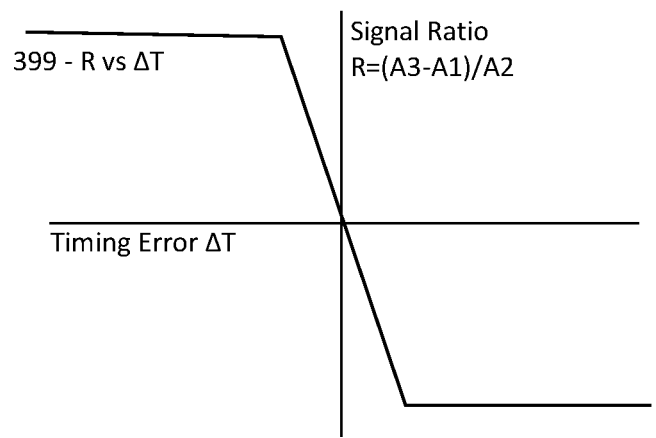
FIG. 3B is a graph showing an exemplary embodiment of a functional relationship between a timing error and a detection ratio with edge pulses, according to some embodiments.

FIG. 3B is a graph showing an exemplary embodiment of a functional relationship between a timing error and a detection ratio with edge pulses, according to some embodiments. As depicted in this non-limiting example, the distribution 399 of the signal ratio R versus the timing error is shown for the previous example. For small timing errors, R has a steep slope, whereas for larger timing errors, R remains constant. Due to the rapid change in R versus timing error, the receiver can measure small timing errors, and can thereby adjust the receiver's clock to the transmitter's clock more precisely.

Figure 4A:
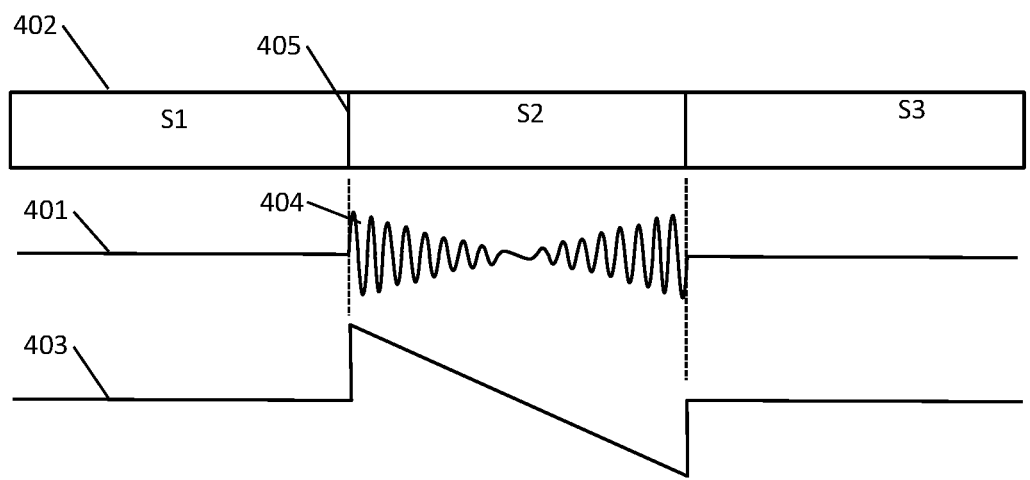
FIG. 4A is a schematic showing an exemplary embodiment of a timing signal including three symbol-times and a ramped amplitude, according to some embodiments.

FIG. 4A is a schematic showing an exemplary embodiment of a timing signal including three symbol-times and a ramped amplitude, according to some embodiments. As depicted in this non-limiting example, a timing signal 401 spans three symbol-times of a resource grid 402, demarked in symbol boundaries 405. The timing signal 401 is zero amplitude in the first and third symbol-times S1 and S3, and has a "ramped" amplitude 404 in the second symbol-time S2. The ramped amplitude 404 varies from a high value at the beginning of the second symbol-time, descending to zero at the center, and continuing in the opposite sense to a maximum at the end of the second symbol-time. The envelope graph 403 shows the amplitude variation without the oscillations.

The receiver can measure the signal, such as the measured amplitude, received in each symbol-time, termed A1, A2, A3 and can calculate a signal ratio R equal to $(A3+A1)/|A2|$. The vertical bars represent magnitude, in this case the magnitude of the amplitude before averaging. The plus sign in the numerator is due to the phase reversal in the ramped distribution. The receiver can then determine a direction and magnitude of a clock error according to the ratio R.

Figure 4B:
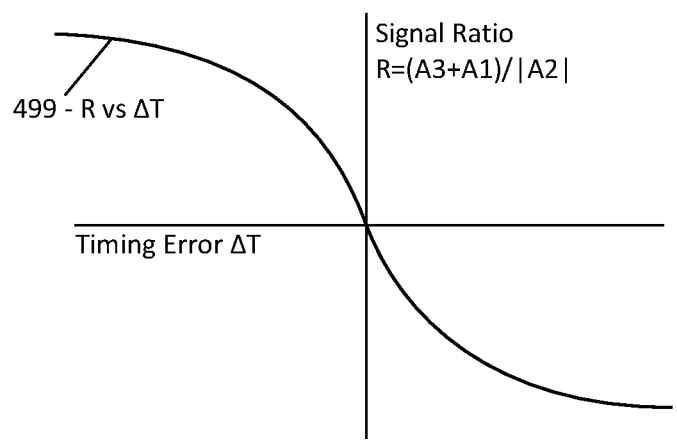
FIG. 4B is a graph showing an exemplary embodiment of a functional relationship between a timing error and a detection ratio with a ramped amplitude, according to some embodiments.

FIG. 4B is a graph showing an exemplary embodiment of a functional relationship between a timing error and a signal ratio with a ramped amplitude, according to some embodiments. As depicted in this non-limiting example, the signal ratio 499 is $R=(A3+A1)/|A2|$ according to the example of FIG. 4A. Due to the ramped shape of the timing signal, the ratio R varies rapidly for small time deviations, and therefore provides high resolution near zero deviation, while also providing detection of large deviations.

Figure 5A:
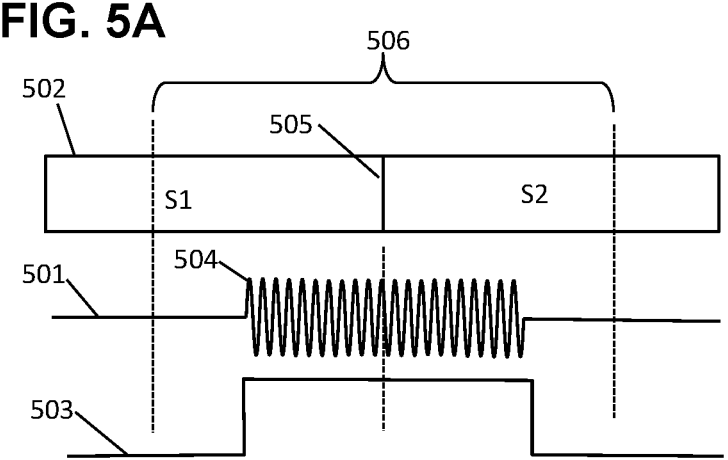
FIG. 5A is a schematic showing an exemplary embodiment of a timing signal including two symbol-times and a uniform amplitude, according to some embodiments.

FIG. 5A is a schematic showing an exemplary embodiment of a timing signal including two symbol-times and a uniform amplitude, according to some embodiments. As depicted in this non-limiting example, a timing signal 501 is shown as a uniform sine wave divided between two symbol-times S1 and S2 of a resource grid 502 defined by symbol boundaries 505. Also shown is the envelope 503 of the timing signal 501. The timing signal 501 is initially at zero amplitude, but then about ⅔ of the way through S1 it abruptly begins a powered region 504 at a high power level, and continues about ⅓ of the way into S2, and then reverts to zero amplitude for the remainder of S2. Thus the powered portion 504 of the timing signal 501 is about ⅔ of a symbol-time in duration and is symmetrically situated at a symbol boundary 505 between the two symbol-times. The receiver is configured to discard energy received in the first third of S1 and the last third of S2, and to analyze signals in an analysis region 506 as indicated by dotted lines.

To detect a clock error, the receiver can determine the measured amplitude of the timing signal 501 in each of the symbol-times S1 and S2. If the receiver's clock is synchronized with the base station's clock, the powered region 504 of the timing signal 501 is equally divided between S1 and S2. However, if there is a clock misalignment, the powered region 504 will be shifted to the left or right, causing one of the two symbol-times to acquire more wave energy than the other. The receiver can calculate a signal ratio of the two symbol-times using a formula such as $R=(A2-A1)/(A2+A1)$, that is, a difference between the measured amplitude in the two symbol-times divided by the sum. This ratio is sensitive to small shifts in timing between the transmitter and receiver clocks. The receiver can normally measure the measured amplitude in a symbol-time using the same signal processing as for amplitude demodulation, and may thereby obtain sufficient precision to detect small timing errors. Thus the receiver can detect small timing offsets, and measure them quantitatively, by measuring amplitudes in symbol-times, and without performing unusual signal processing such as determining a time of an abrupt modulation change or other timestamp point, and without exchanging synchronization messages (other than the brief two-symbol timing signal 501). In effect, the timestamp point is the center of the powered region 504. The position of the powered region 504 is determined according to the distance of the timestamp point from the central symbol boundary 505.

An advantage of the depicted timing signal 501 may be that the timing signal 501 is a uniform sine wave which is relatively easy for the transmitter to transmit and for the receiver to receive. Another advantage may be that the amplitude measurements in the two symbol-times may be relatively easy for the receiver to process and quantify, since such signal processing is its normal function. Another advantage may be that the timing signal 501 is compact, only two symbol-times long, further minimizing resource usage.

Figure 5B:
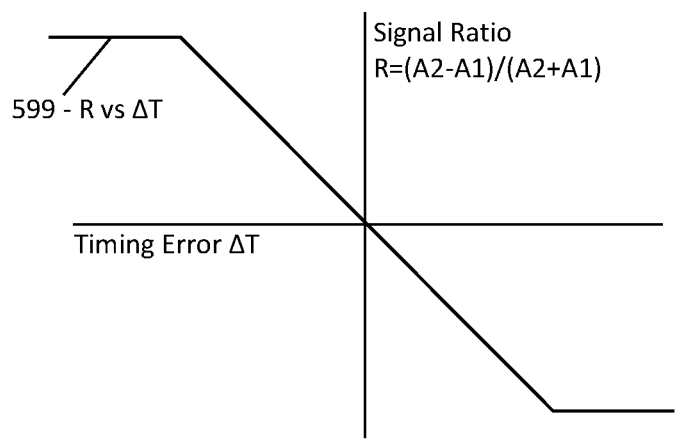
FIG. 5B is a graph showing an exemplary embodiment of a functional relationship between a timing error and a detection ratio with a uniform amplitude, according to some embodiments.

FIG. 5B is a graph showing an exemplary embodiment of a functional relationship between a timing error and a detection ratio with a uniform amplitude, according to some embodiments. As depicted in this non-limiting example, a functional relationship 599 is shown relating a timing error to a signal ratio $R=(A2-A1)/(A2+A1)$, according to the timing signal 501 of the previous figure. Since the denominator includes the entire powered section 504 of the timing signal 501, the functional relationship 599 is approximately linear until the timing error is so large that the edge of the powered region 504 passes by the S1-S2 symbol boundary 505, after which R is constant. Hence the receiver can determine the timing error by measuring the measured amplitudes received in the two symbol-times. No message exchanges or other legacy overhead are required.

Figure 6A:
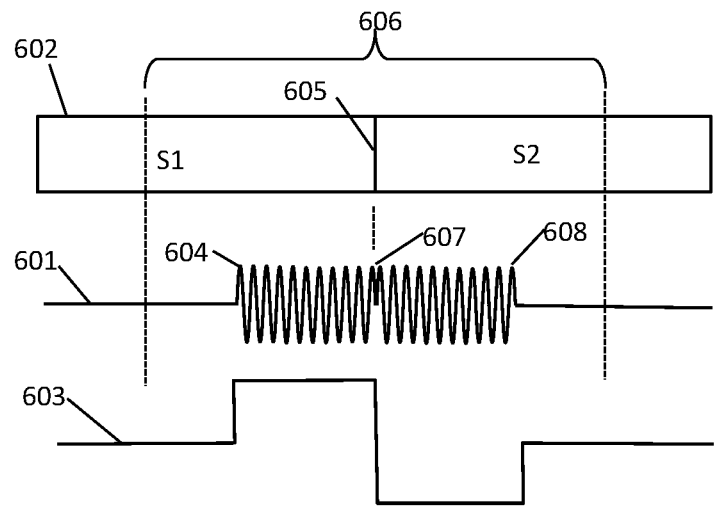
FIG. 6A is a schematic showing an exemplary embodiment of a timing signal including two symbol-times and a phase-flip amplitude, according to some embodiments.

FIG. 6A is a schematic showing an exemplary embodiment of a timing signal including two symbol-times and a phase-flip amplitude, according to some embodiments. As depicted in this non-limiting example, a timing signal 601 spans two symbol-times S1 and S2 of a resource grid 602 with a symbol boundary 605. The analysis region 606 is shown, and any signals exterior to the dotted lines are discarded. The timing signal 601 is initially at zero amplitude, then begins a powered region 604 of uniform amplitude, then has an abrupt phase reversal 607 centrally positioned in the powered region 604, followed by another uniform amplitude region 608 with reversed amplitude (or equivalently, reversed phase), followed by another zero transmission region. The amplitude envelope 603 is also shown, indicating a positive amplitude region 604 abruptly changing to a negative amplitude region 608.

If the transmitter and receiver clocks are synchronized, the phase reversal 607 occurs at the boundary 605 between S1 and S2. If the clocks are not synchronized, a portion of the powered region 604 or 608 will be shifted out of S1 and into S2, or vice-versa, depending on the sign of the clock offset. Hence the receiver can determine the clock offset by measuring the measured amplitude A1 and A2 in the two symbol-times. As mentioned, amplitude with reversed phase counts as negative amplitude.

Figure 6B:
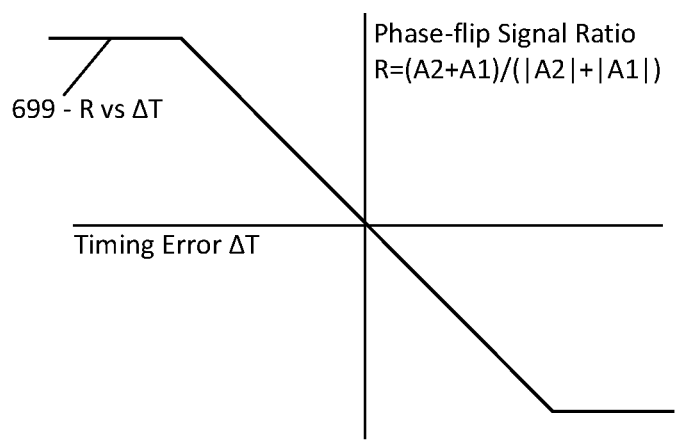
FIG. 6B is a graph showing an exemplary embodiment of a functional relationship between a timing error and a detection ratio with a phase-flip amplitude, according to some embodiments.

FIG. 6B is a graph showing an exemplary embodiment of a functional relationship 699 between a timing error and a detection ratio with a phase-flip amplitude, according to some embodiments. As depicted in this non-limiting example, a clock time error $\Delta T$ is determined by the signal ratio $(A1+A2)/(|A1|A2|)$. The formula sign in the numerator reflects the opposite signs of the signal amplitudes in the first and second regions 604, 608 of the previous example. In the denominator, the magnitude of the amplitude is determined and averaged in each symbol-time. By symmetry, the signal ratio is zero if the phase reversal 607 is centered on the symbol boundary 605 between S1 and S2, and varies approximately linearly for positive and negative timing errors.

Figure 7A:
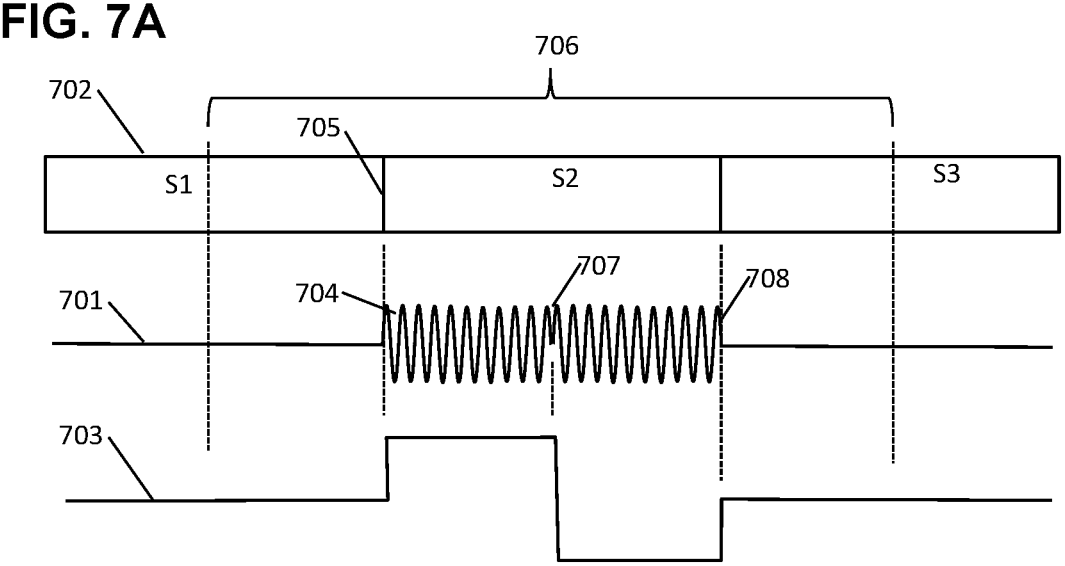
FIG. 7A is a schematic showing an exemplary embodiment of a timing signal including three symbol-times and a phase-flip amplitude, according to some embodiments.

FIG. 7A is a schematic showing an exemplary embodiment of a timing signal including three symbol-times and a phase-flip amplitude, according to some embodiments. As depicted in this non-limiting example, a timing signal 701 spans three symbol-times S1, S2, S3 of a resource grid 702, with symbol boundaries 705 between symbol-times. The timing signal 701 is initially at zero amplitude in S1, then in S2 is a uniform amplitude 704 for one-half of a symbol-time, and abruptly changes at 707 to the opposite phase (or amplitude) in the middle of S2, followed by another uniform amplitude region 708 at negative amplitude, and then zero amplitude in S3. The amplitude envelope 703 is also shown. The analysis region 706 extends from the middle of S1 to the middle of S3 as indicated by dotted lines. The exterior regions are discarded by the receiver.

If the receiver clock is synchronized with the transmitter, the phase reversal 707 will be centered in S2 and the measured amplitude will be zero in all three symbol-times. If the receiver's clock is misaligned with the transmitter, then the timing signal 701 will be shifted left or right, thereby causing a portion of the powered portion 704 or 708 to appear in either S1 or S3. The receiver can determine the measured amplitude in all three symbol-times A1, A2, A3 and thereby measure the timing error. For example, the receiver can calculate a signal ratio R equal to $(A3+A1)/(|A1|+|A2|+|A3|)$ where the numerator sign reflects the amplitude signs, and vertical bars represent magnitude. Using that signal ratio, or another equivalent formula, the receiver can measure the sign and magnitude of the timing error according to the measured amplitude in the three symbol times.

Figure 7B:
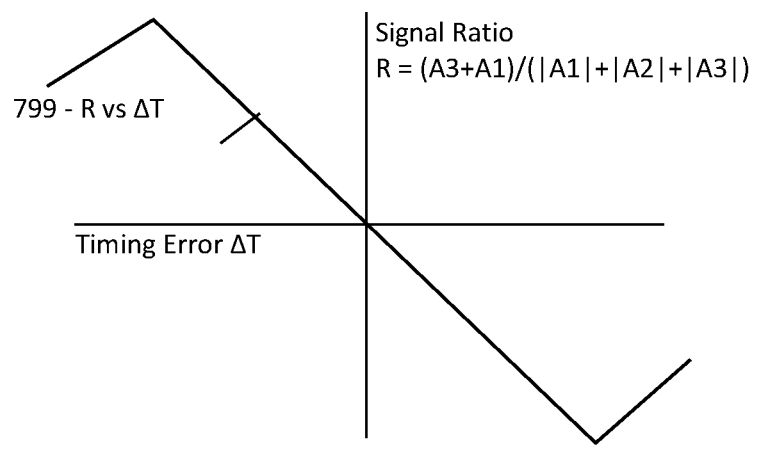
FIG. 7B is a graph showing an exemplary embodiment of a functional relationship between a timing error and a detection ratio with a phase-flip amplitude, according to some embodiments.

FIG. 7B is a graph showing an exemplary embodiment of a functional relationship between a timing error and a detection ratio with a phase-flip amplitude, according to some embodiments. As depicted in this non-limiting example, a functional relationship 799 between a timing error $\Delta T$ and a signal ratio R, as described in the previous example, produces a linear relationship as shown. When the timing error becomes large enough for the phase reversal 707 to finally pass by one of the symbol boundaries 705 of S2, the signal ratio R begins to decrease due to the accumulation of opposite-sign amplitude in either S1 or S3. Throughout the linear region, the receiver can determine the timing error by measuring the measured amplitudes in the three symbol-times.

Figure 8A:
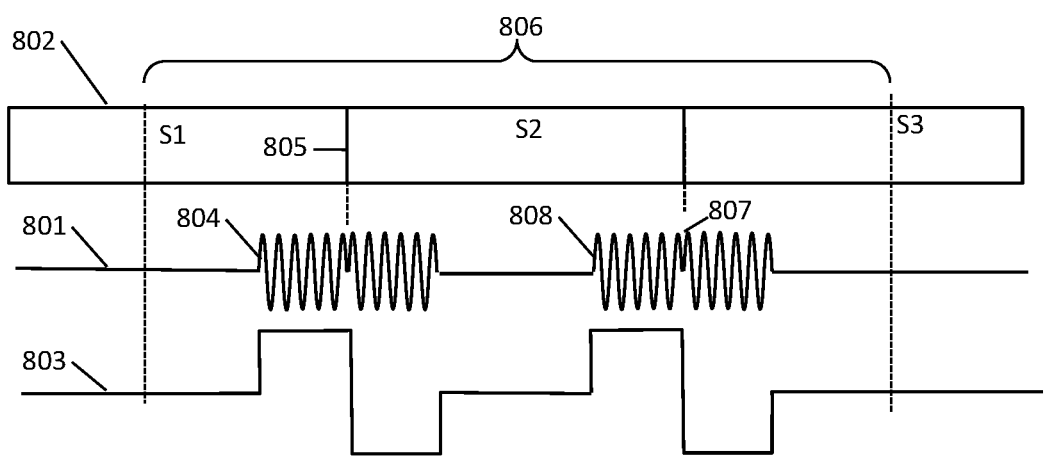
FIG. 8A is a schematic showing an exemplary embodiment of a timing signal including three symbol-times, end-pulses, and a phase-flip amplitude, according to some embodiments.

FIG. 8A is a schematic showing an exemplary embodiment of a timing signal including three symbol-times, end-pulses, and a phase-flip amplitude, according to some embodiments. As depicted in this non-limiting example, a timing signal 801 spans three symbol-times S1, S2, S3 separated by symbol boundaries 805 in a resource grid 802. The timing signal 801 includes two separate amplitude regions 804, 808. Each of the amplitude regions includes a central phase inversion 807 so that the amplitude before the phase inversion is opposite to the amplitude after the phase inversion. Also shown is an amplitude envelope 803. The phase-reversed signal is shown as a negative amplitude. Dotted lines show the limits of the analysis region 806.

When the receiver clock is synchronized with the transmitter clock, the two phase inversions 807 are coincident with the two symbol boundaries 805 of S2. If the receiver clock disagrees with the transmitter clock, the timing signal 805 is shifted relative to the receiver's symbol boundaries, which alters the amplitudes measured by the receiver in the three symbol times. For example, if the receiver clock is behind the transmitter clock, the timing signal 801 will arrive too soon, causing the first amplitude region 804 to shift from S1 partially towards S2, and the amplitude region 808 to shift from S2 partially into S3. The receiver would then measure a lower positive measured amplitude in S1, an increasingly negative measured amplitude in S2, and an increasingly positive amplitude in S2. If the timing error is reversed, the amplitude changes are also reversed. The receiver can measure the amplitude A1, A2, A3 in the three symbol-times, and can then accumulate the timing changes in a signal ratio R equal to $(A3+A1)/(|A1|+|A2|+|A3|)$ which is zero when the two clocks are synchronized.

Figure 8B:
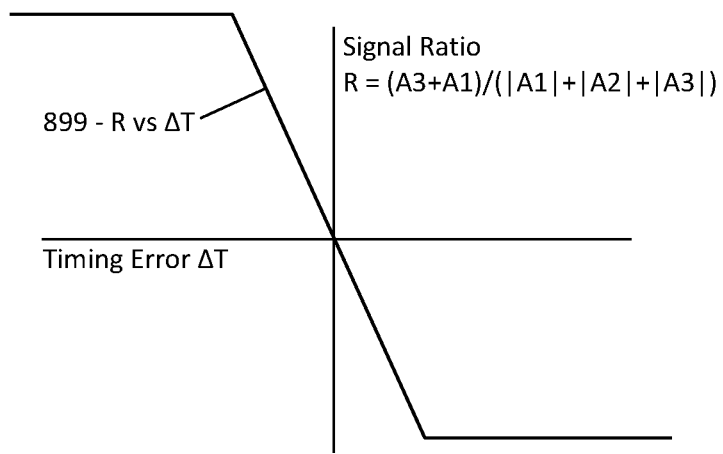
FIG. 8B is a graph showing an exemplary embodiment of a functional relationship between a timing error and a detection ratio with end-pulses and a phase-flip amplitude, according to some embodiments.

FIG. 8B is a graph showing an exemplary embodiment of a functional relationship between a timing error and a detection ratio with end-pulses and a phase-flip amplitude, according to some embodiments. As depicted in this non-limiting example, a functional relationship 899 between the timing error and the signal ratio of the previous example includes a linear central region corresponding to portions of the amplitude regions 804, 808 shifting across the S2 symbol boundaries 805. For larger displacements, R becomes a flat response after the amplitude region has completely passed the symbol boundary. By measuring just the three average amplitudes A1, A2, A3 in the three symbol-times, the receiver can determine the timing error. In addition, since in this case there are two timestamp points at the two S2 boundaries, noise conditions that change in time may be averaged in the signal ratio, thereby providing a more accurate measure of the timing error.

Due to the many options and variations disclosed herein, and other versions derived therefrom by artisans after reading this disclosure, it would be helpful for a wireless standards committee to establish conventions governing formats and implementation options for providing compact timing signals and ultra-lean procedures for precision synchronization, as disclosed. Such beneficial timing and frequency alignment procedures may enable users to communicate in 5G and 6G multi-GHz bands with increased reliability, while avoiding unnecessary messaging and delays.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a wireless receiver to synchronize a clock, the method comprising:
   receiving, according to a synchronization schedule, a timing signal comprising a wireless signal, wherein the wireless signal is received on a particular subcarrier and spans a plurality of symbol-times of a resource grid, wherein the resource grid comprises subcarriers in frequency and symbol-times in time, wherein the plurality of symbol-times comprises a first symbol-time and a last symbol-time;
   determining, for each symbol-time of the timing signal, according to a receiver clock of the receiver, a measured amplitude comprising an average amplitude or an average power or a total energy received in the symbol-time;
   calculating a ratio "R" comprising a numerator divided by a denominator, wherein the numerator comprises a difference of the measured amplitudes in the first and last symbol-times, and the denominator comprises the measured amplitude in at least one symbol-time of the plurality.

2. The method of claim 1, wherein the timing signal is received according to 5G or 6G technology.

3. The method of claim 1, further comprising:
   determining, according to the ratio, a timing error; and
   adjusting the receiver clock according to the timing error.

4. The method of claim 1, wherein:
   the timing signal is transmitted by a transmitter comprising a transmitter clock; and
   the timing error comprises a difference between a time of the transmitter clock and a time of the receiver clock.

5. The method of claim 1, wherein the synchronization schedule comprises a periodicity.

6. The method of claim 1, wherein the first and last symbol-times each comprise zero amplitude, as transmitted by a transmitter.

7. The method of claim 6, wherein:
the timing signal spans exactly three sequential symbol-times;
"S1", "S2", and "S3" represent the three symbol-times, respectively;
"A1", "A2", and "A3" represent the measured amplitudes in the three symbol-times, respectively;
the numerator comprises (A3−A1); and
the denominator comprises (A2).

8. The method of claim 6, wherein:
the timing signal spans exactly three sequential symbol-times;
"S1", "S2", and "S3" represent the three symbol-times, respectively;
"A1", "A2", and "A3" represent the measured amplitudes in the three symbol-times, respectively;
the numerator comprises (A3+A1); and
the denominator comprises (|A1|+A2|+|A3|).

9. The method of claim 6, wherein:
the timing signal spans exactly three sequential symbol-times;
"S1", "S2", and "S3" represent the three symbol-times, respectively;
"A1", "A2", and "A3" represent the measured amplitudes in the three symbol-times, respectively;
the numerator comprises (A3−A1); and
the denominator comprises (|A1|+|A2|+|A3|).

10. The method of claim 6, wherein:
the timing signal spans exactly three sequential symbol-times;
"S1", "S2", and "S3" represent the three symbol-times, respectively;
"A1", "A2", and "A3" represent the measured amplitudes in the three symbol-times, respectively;
the numerator comprises (A3+A1); and
the denominator comprises (A2).

11. The method of claim 1,
the timing signal spans exactly two sequential symbol-times;
"S1" and "S2" represent the two symbol-times, respectively;
"A1" and "A2" represent the measured amplitudes in the two symbol-times, respectively;
the ratio comprises (A2−A1)/(A1+A2).

12. The method of claim 1, wherein the timing signal comprises a centrally positioned 180 degree phase change.

13. The method of claim 1, further comprising:
ignoring or discarding a first portion of the first symbol-time and a last portion of the last symbol-time.

14. The method of claim 1,
the timing signal spans exactly two sequential symbol-times;
"S1" and "S2" represent the two symbol-times, respectively;
"A1" and "A2" represent the measured amplitudes in the two symbol-times, respectively;
the ratio comprises (A2+A1)/(A1−A2).

15. A method for a wireless receiver to synchronize a clock, the method comprising:
receiving, according to a synchronization schedule, a timing signal comprising a wireless signal, wherein the wireless signal is received on a particular subcarrier and spans a plurality of symbol-times of a resource grid, wherein the resource grid comprises subcarriers in frequency and symbol-times in time, wherein the plurality of symbol-times comprises a first symbol-time and a last symbol-time;
determining, for each symbol-time of the timing signal, according to a receiver clock of the receiver, a measured amplitude comprising an average amplitude or an average power or a total energy received in the symbol-time;
calculating a ratio "R" comprising a numerator divided by a denominator, wherein the numerator comprises a sum of the measured amplitudes in the first and last symbol-times, and the denominator comprises the measured amplitude in at least one symbol-time of the plurality.

* * * * *